US010939089B1

United States Patent
Li et al.

(10) Patent No.: US 10,939,089 B1
(45) Date of Patent: Mar. 2, 2021

(54) CALIBRATION APPARATUS FOR TIME OF FLIGHT DEPTH SENSOR

(71) Applicant: Facebook Technologies, LLC, Menlo Park, CA (US)

(72) Inventors: Fengqiang Li, Redmond, WA (US); Michael Hall, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 161 days.

(21) Appl. No.: 16/219,863

(22) Filed: Dec. 13, 2018

(51) Int. Cl.
*G01S 17/08* (2006.01)
*H04N 13/246* (2018.01)
*G06T 7/593* (2017.01)
*G01S 7/4865* (2020.01)
*G01S 17/89* (2020.01)
*G02B 27/01* (2006.01)
*G01S 7/497* (2006.01)
*G06T 7/80* (2017.01)

(52) U.S. Cl.
CPC ......... *H04N 13/246* (2018.05); *G01S 7/4865* (2013.01); *G01S 7/497* (2013.01); *G01S 17/89* (2013.01); *G02B 27/0101* (2013.01); *G02B 27/0172* (2013.01); *G06T 7/593* (2017.01); *G06T 7/80* (2017.01); *G06T 7/85* (2017.01); *G02B 2027/0134* (2013.01); *G02B 2027/0138* (2013.01); *G02B 2027/0178* (2013.01)

(58) Field of Classification Search
CPC ....... G01S 17/894; G01S 17/89; G06T 7/521; G06T 19/006; G06T 7/80; G06T 7/85
See application file for complete search history.

(56) References Cited

U.S. PATENT DOCUMENTS

| 10,630,925 | B1* | 4/2020 | Li | H04N 5/37452 |
|---|---|---|---|---|
| 10,663,567 | B2* | 5/2020 | Fenton | G01S 7/4972 |
| 2017/0272726 | A1* | 9/2017 | Ovsiannikov | G01C 25/00 |
| 2017/0276789 | A1* | 9/2017 | Ikeno | H04N 5/3696 |
| 2018/0135980 | A1* | 5/2018 | Nakamura | G01S 17/894 |
| 2020/0090355 | A1* | 3/2020 | Hall | G01S 7/4863 |

OTHER PUBLICATIONS

Accurate calibration for camera-projector measurement based on structured light projection; Chen; 2009; (Year: 2009).*
Calibration for Increased Accuracy of the Range Imaging Camera Swiss-ranger; Kahlmann; 2006; (Year: 2006).*
Accurate calibration for camera-projector measurement based on structured light; Chen; 2009; (Year: 2009).*
Reliability function of ToF depth and stereo geometry for high quality depth maps; Zhu; 2011; (Year: 2011).*

* cited by examiner

*Primary Examiner* — Luis Perez-Fuentes
(74) *Attorney, Agent, or Firm* — Fenwick & West LLP

(57) ABSTRACT

A calibration assembly for calibrating a depth sensor. The calibration assembly includes a pathway and a controller coupled to a depth sensor. The pathway is coupled to a light source, and a pulse of light from the light source is directed through the pathway to the depth sensor at a first time. The controller determines a second time at which a measurement of the light pulse detected at an augmented pixel of the depth sensor is read out. The controller computes a readout delay for the augmented pixel based on the first time, the second time, and an estimated travel time for the light pulse from the light source to the augmented pixel. The controller stores the readout delay, and a depth camera that includes the depth sensor is configured to calibrate out the readout delay relative to other augmented pixels of the depth sensor.

16 Claims, 7 Drawing Sheets

CALIBRATION APPARATUS FOR TIME OF FLIGHT DEPTH SENSOR

BACKGROUND

The present disclosure generally relates to depth sensing, and specifically relates to calibrating a depth camera assembly having augmented pixels.

To achieve compelling user experience in artificial reality systems, it is essential to rely on an accurate and efficient camera for sensing a three-dimensional (3D) surrounding environment. However, it is challenging to design a depth camera having a high performance and low computational power, which is also robust to the environment, flexible to operate, and have a compact form factor. Some depth cameras use depth determination techniques that are based in part on precise timing and activation and deactivation of pixels in the depth camera. However, variations in timing between activations or deactivations of individual pixels in depth cameras can lead to depth errors in a depth map produced using such depth cameras.

SUMMARY

The present disclosure describes a calibration assembly for calibrating a depth sensor that includes a set of augmented pixels. The depth sensor may be included in an eyewear device that is a component of an artificial reality head-mounted display (HMD), e.g., as part of a depth camera that determines depth information for a local area surrounding the HMD. Each augmented pixel in the depth sensor has a readout delay, which is a delay in reading out the charge from the local storage locations that store measurements of detected light for the augmented pixel. Different augmented pixels in the depth sensors have different readout delays, which can lead to an arbitrary error on the depth map.

A calibration apparatus enables a time-efficient and size-efficient method for calibrating the depth sensor by determining the readout delay for each augmented pixel. The calibration apparatus includes a pathway through which a pulse of light from a light source is directed to a depth sensor, and a controller for computing per-pixel readout delays. For each augmented pixel, the controller measures the time that it took the light pulse to be transmitted from the light source to the depth sensor and read out by the augmented pixel, and compares this measured time to the time it takes the light pulse to reach the augmented pixel from the light source. After the readout delays have been determined, the depth sensor is configured to calibrate out the readout delays, resulting in a depth map that corrects for the readout delays.

In some embodiments, a method for calibrating a depth sensor with augmented pixels is described herein. A light source transmits a pulse of light through a pathway of the calibration assembly to the depth sensor at a first time. A controller determines a second time at which a measurement of the pulse of light detected at an augmented pixel of the depth sensor is read out from the augmented pixel. The controller computes a readout delay for the augmented pixel, the readout delay based on the first time, the second time, and an estimated travel time for the pulse of light from the light source to the augmented pixel. The readout delay is stored, and a depth camera that includes the depth sensor is configured to calibrate out the readout delay relative to other augmented pixels of the depth sensor.

In some embodiments, a calibration assembly is described herein. The calibration assembly includes a pathway and a controller coupled to a depth sensor. The pathway is coupled to a light source, and a pulse of light from the light source is directed through the pathway to the depth sensor at a first time. The controller is configured to determine a second time at which a measurement of the pulse of light detected at an augmented pixel of the depth sensor is read out from the augmented pixel. The controller is further configured to compute a readout delay for the augmented pixel based on the first time, the second time, and an estimated travel time for the pulse of light from the light source to the augmented pixel. The controller stores the readout delay, and a depth camera that includes the depth sensor is configured to calibrate out the readout delay relative to other augmented pixels of the depth sensor.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

Overview of a Depth Camera Assembly

Figure 1:
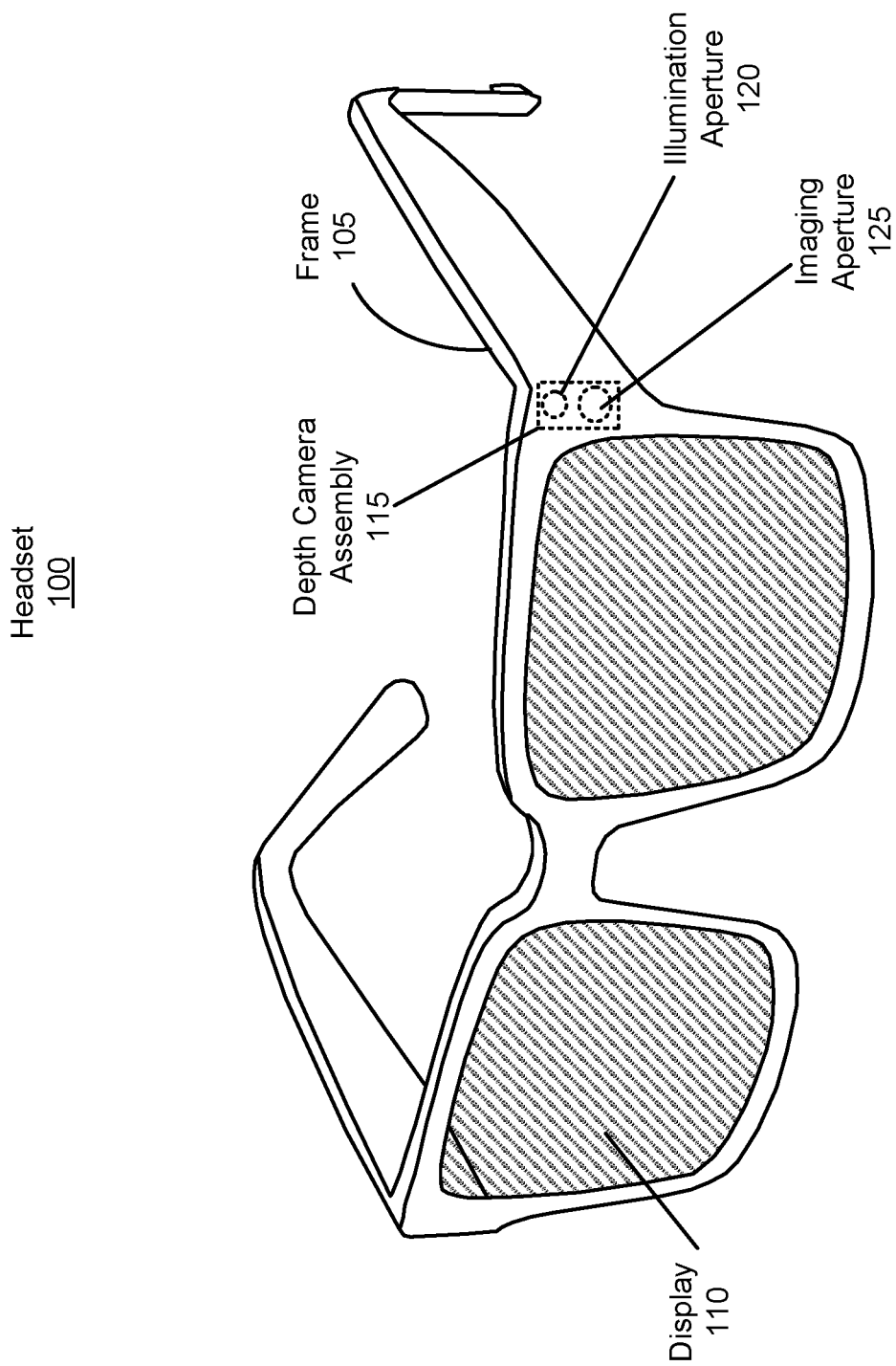
FIG. 1 is a diagram of a headset, in accordance with one or more embodiments.

FIG. 1 is a diagram of a headset 100, in accordance with one or more embodiments. In the illustrated example, the headset 100 is a near-eye display (NED). In other embodiments, the headset 100 is a head-mounted display (HMD). The headset 100 presents media to a user. Examples of media presented by the headset 100 include one or more images, video, audio, or some combination thereof. In some embodiments, audio is presented via an external device (e.g., speakers and/or headphones) that receives audio information from the headset 100, a console (not shown), or both, and presents audio data based on the audio information. The headset 100 may be part of an artificial reality system (not shown). The headset 100 is generally configured to operate as an artificial reality headset. In some embodiments, the headset 100 may augment views of a physical, real-world environment with computer-generated elements (e.g., images, video, sound, etc.).

The headset 100 shown in FIG. 1 includes a frame 105 and a display 110. The frame 105 includes one or more optical elements which together display media to users. The display 110 is configured for users to see the content presented by the headset 100. The display 110 generates an image light to present media to an eye of the user.

The headset 100 further includes a depth camera assembly (DCA) 115 configured to determine depth information of a local area surrounding some or all of the headset 100. The headset 100 also includes an illumination aperture 120 and an imaging aperture 125, and a light source assembly of the DCA 115 emits light (e.g., polarized light, structured light, etc.) through the illumination aperture 120. A camera assembly of the DCA 115 captures light from the light source assembly that is reflected from the local area through the imaging aperture 125. Light emitted from the light source assembly of the DCA 115 through the illumination aperture 120 may comprise pulses of light, as discussed in more detail in conjunction with FIGS. 2-3B. Light reflected from the local area through the imaging aperture 125 and captured by the camera assembly of the DCA 115 may comprise at least a portion of the reflected pulses of light, as also discussed in more detail in conjunction with FIGS. 2-3B.

Position of the DCA 115 within the headset 100 shown in FIG. 1 is only illustrative, and the DCA 115 can be located elsewhere on the frame 105, e.g., on any temple of the frame 105. Also, components of the DCA 115 can be located on different locations of the frame 105, e.g., the light source assembly and the illumination aperture 120 can be located on one temple of the frame 105 whereas the camera assembly and the imaging aperture 125 can be located on another temple of the frame 105. The headset 100 shown in FIG. 1 is only an example of an artificial reality system. In alternate embodiments (not shown in FIG. 1), the DCA 115 could be part of an artificial reality system that includes a HMD, e.g., the DCA 115 can be integrated into the HMD.

In one embodiment, the DCA 115 presented in this disclosure provides the determined depth information to a console coupled to the headset 100. The console is then configured to generate content for presentation on an electronic display of the headset 100, based on the depth information. In another embodiment, the DCA 115 presented herein provides the determined depth information to a module of the headset 100 that generates content for presentation on the electronic display of the headset 100, based on the depth information. In an alternate embodiment, the DCA 115 is integrated into the headset 100 as part of an AR system. In this case, the headset 100 may be configured to sense and display objects behind a head of a user wearing the headset 100 or display objects recorded previously. In yet other embodiment, the DCA 115 is integrated into a base station or a sensor bar external to the headset 100. In this case, the DCA 115 may be configured to sense various body parts of a user wearing the headset 100, e.g., the user's lower body. In yet other embodiment, the DCA 115 is configured as part of a controller or as part of a capture system to capture VR content, AR content, and/or MR content.

Figure 2:
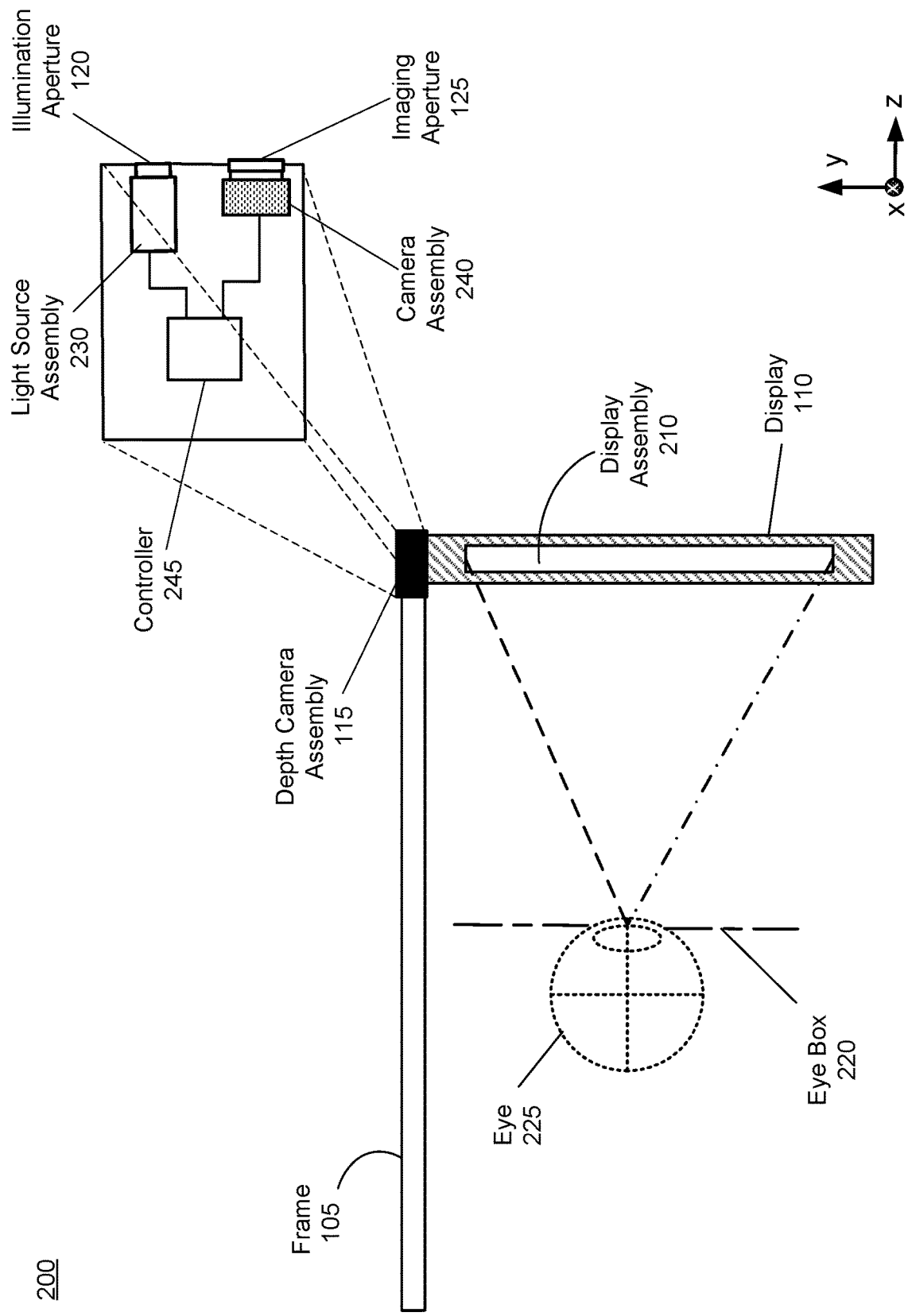
FIG. 2 is a cross-section of the headset in FIG. 1, in accordance with one or more embodiments.

FIG. 2 is a cross section 200 of the headset 100 illustrated in FIG. 1, in accordance with one or more embodiments. The cross section 200 includes at least one display assembly 210 integrated into the display 110, an eye box 220, and the DCA 115. The eye box 220 is a location where an eye 225 is positioned when a user wears the headset 100. In some embodiments, the frame 105 may represent a frame of eye-wear glasses. For purposes of illustration, FIG. 2 shows the cross section 200 associated with a single eye 225 and a single display assembly 210, but in alternative embodiments not shown, another display assembly which is separate from the display assembly 210 shown in FIG. 2, provides image light to another eye 225 of the user.

The display assembly 210 is configured to direct the image light to the eye 225 through the eye-box 220. In some embodiments, when the headset 100 is configured as an AR headset, the display assembly 210 also directs light from a local area surrounding the headset 100 to the eye 225 through the eye box 220. The display assembly 210 may be configured to emit image light at a particular focal distance in accordance with varifocal instructions, e.g., provided from a varifocal module (not shown in FIG. 2).

The display assembly 210 may be composed of one or more materials (e.g., plastic, glass, etc.) with one or more refractive indices that effectively minimize the weight and present to the user a field of view of the headset 100. In alternate configurations, the headset 100 includes one or more optical elements between the display assembly 210 and the eye 225. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210.

The DCA 115 mounted on the frame 105 includes a light source assembly 230, a camera assembly 240, and a controller 245 coupled to the light source assembly 230 and the camera assembly 240. In alternative embodiments (not shown in FIG. 2), the light source assembly 230 and the camera assembly 240 each may include its own internal controller. In some embodiments (not shown in FIG. 2), the light source assembly 230 and the camera assembly 240 can be separated, e.g., the light source assembly 230 and the camera assembly 240 can be located in different assemblies.

The light source assembly 230 may illuminate, e.g., through the illumination aperture 120, the local area with light in accordance with emission instructions generated by the controller 245. The light source assembly 230 may be configured to project pulses of light into the local area, e.g., through the illumination aperture 120. The light source assembly 230 may include a plurality of light sources, e.g., a two-dimensional array of light sources. Examples of light sources include but are not limited to: light-emitting diodes (LEDs), micro light-emitting diodes (µLEDs), micro super luminescent diodes (µSLDs), vertical-cavity surface-emitting lasers (VCSELs), micro resonant cavity light-emitting diodes (µRCLEDs), some other light source that emits light, or some combination thereof. Alternatively, the light source assembly 230 includes a single light source emitting the pulses of light. In some embodiments, the light source assembly 230 includes projection optics that in-couples light from one or more sources of the light source assembly 230 and projects the light over at least a portion of the local area. The light source assembly 230 may be able to emit light in different bands. Furthermore, the light source assembly 230 may be configured to emit different patterns of light, e.g., structured light, diffuse flash, etc. The timing of light source assembly 230 being activated to emit light can be controlled based on, e.g., emission instructions from the controller 245.

The camera assembly 240 is configured to image a portion of the local area illuminated with the pulses of light. The camera assembly 240 may be configured to operate with a frame rate in the range of approximately 30 Hz to approximately 1 KHz for fast detection of objects in the local area. The camera assembly 240 includes a depth sensor (not shown in FIG. 2) having a plurality of augmented pixels for capturing light coming from the local area, e.g., through the imaging aperture 125. Each augmented pixel includes a plurality of gates, and at least some of the gates have a respective local storage location. An exposure interval of each augmented pixel may be divided into intervals and some of the intervals are synchronized to the pulses of light projected by the light source assembly 230 such that each respective local storage location of each augmented pixel stores image data during a respective interval. The sensor comprising the augmented pixels is described in more detail in conjunction with FIGS. 3A-3B. In some embodiments, the camera assembly 240 includes one or more filters (e.g., an infrared filter) for blocking at least portion of ambient light from reaching the sensor of the imaging device 240. The imaging device 240 may be sensitive to different bands of light, e.g., infrared light including one or more bands between 700 nm and 1 mm.

The controller 245 may generate the emission instructions and provide the emission instructions to the light source assembly 230 for controlling operation of each individual light source in the light source assembly 230. The controller 245 may also generate capture instructions and provide the capture instructions to the camera assembly 240 to control timing of the intervals during which respective local storage locations of each augmented pixel in the depth sensor of the camera assembly 240 stores image data. The controller 245 may determine depth information for the local area based on the times of flight of the detected light pulses associated with the image data stored in the respective local storage locations of each augmented pixel in the depth sensor of the camera assembly 240. The depth information may be arranged as a depth map, which indicates measured depths across a two-dimensional area captured by the depth sensor.

Generating depth information for a local area based on image data stored in the respective storage locations of each augmented pixel is described in U.S. application Ser. No. 16/219,511, filed Dec. 13, 2018, which is herein incorporated by reference in its entirety.

In some embodiments, the controller 245 provides the determined depth information to a console (not shown in FIG. 2) and/or an appropriate module of the headset 100 (e.g., a varifocal module, not shown in FIG. 2). The console and/or the headset 100 may utilize the depth information to, e.g., generate content for presentation on the display 110.

Figure 3A:
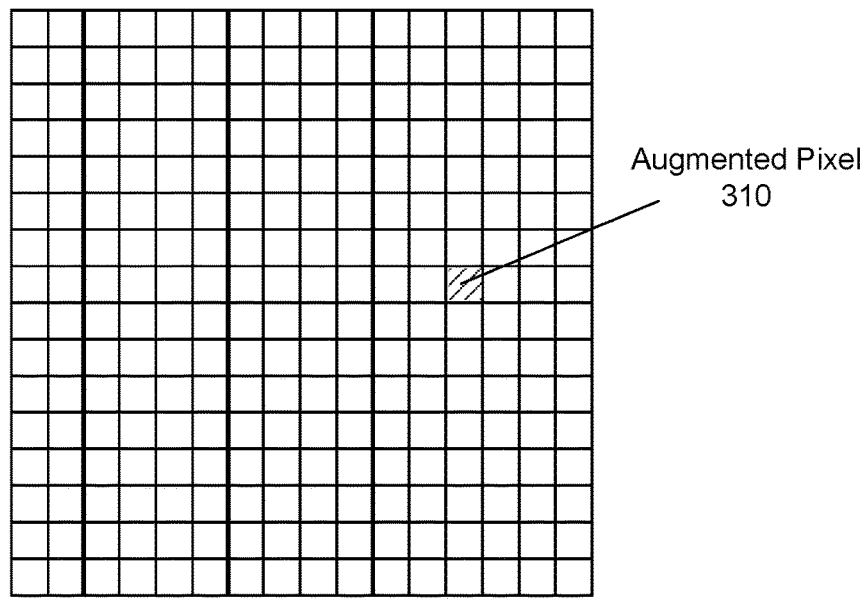
FIG. 3A is an example depth sensor having a plurality of augmented pixels, in accordance with one or more embodiments

FIG. 3A is an example depth sensor 300 having a plurality of augmented pixels 310, in accordance with one or more embodiments. The depth sensor 300 may be part of the DCA 115, e.g., the depth sensor 300 may be integrated into the camera assembly 240 of the DCA 115 shown in FIG. 2. Alternatively, the depth sensor 300 may be implemented as part of some other camera assembly. The depth sensor 300 may capture, via the augmented pixels 310, light from a local area surrounding some or all of the headset 100. The light captured by the augmented pixels 310 of the depth sensor 300 may originate from light emitted by the light source assembly 230 of the DCA 115 and reflected from one or more objects in the local area, may originate from light emitted by some other light source (e.g., of the headset 100) and reflected from the local area, may originate from ambient light of the local area, or combination thereof. The augmented pixels 310 may be organized within the depth sensor 300 as a two-dimensional array of augmented pixels 310. While the depth sensor 300 illustrated in FIG. 3A is 16×16 sensor, in other embodiments the depth sensor 300 may have some other number of columns and/or rows. The depth sensor 300 can be generally described as an N×M sensor having N rows of augmented pixels 310 and M columns of augmented pixels 310.

Figure 3B:
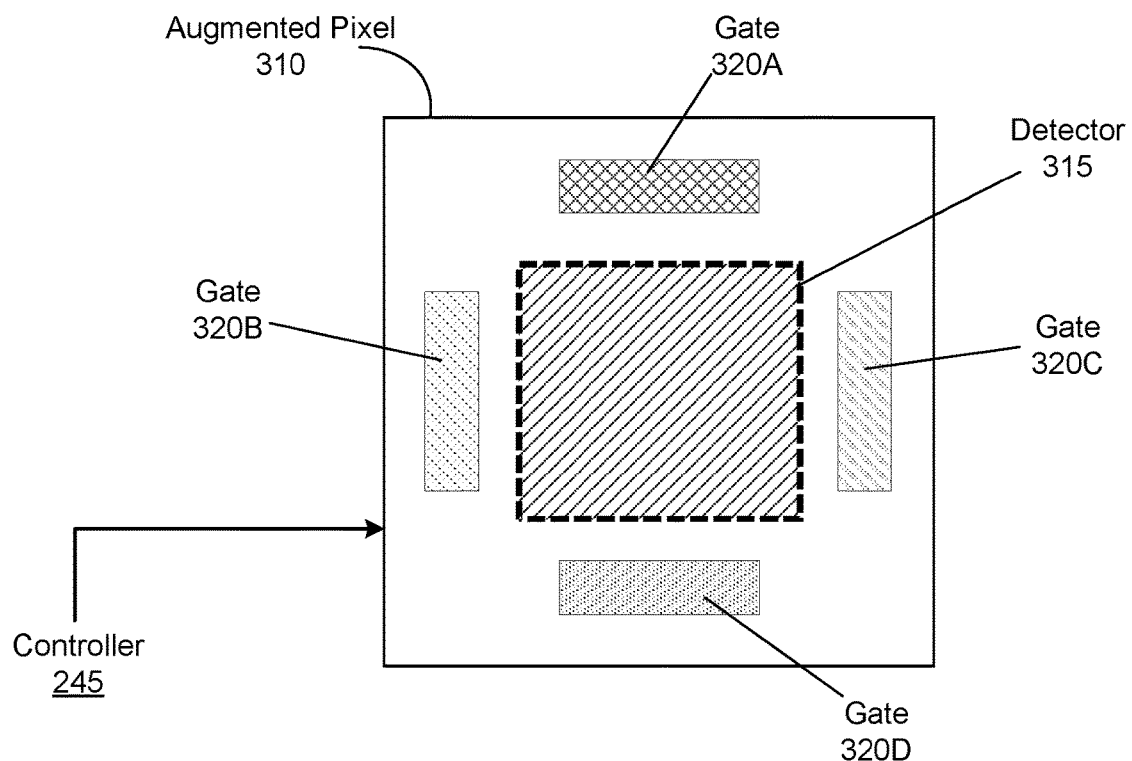
FIG. 3B is an example augmented pixel of the depth sensor in FIG. 3A, in accordance with one or more embodiments.

FIG. 3B is an example augmented pixel 310 of the depth sensor 300 in FIG. 3A, in accordance with one or more embodiments. The augmented pixel 310 captures, over multiple time intervals, intensities of light incident on a surface of the augmented pixel 310. The augmented pixel 310 includes a detector 315 and a plurality of gates, e.g., gates 320A, 320B, 320C, and 320D as shown in FIG. 3B. Although the augmented pixel 310 shown in FIG. 3B includes three gates, each augmented pixel 310 of the depth sensor 300 may include less than three gates (e.g., two gates) or more than three gates (e.g., four or five gates).

The detector 315 represents a photo-sensitive area of the augmented pixel 310. The detector 315 in-couples, e.g., through an aperture, photons of incident light and transforms the captured photons into electrons (charge). An appropriate electric field generated at a specific time interval based on, e.g., capture instructions from the controller 245, guides the charge from the detector 315 to a local storage location associated with a specific gate, e.g., the gate 320A, 320B, or 320C or to a ground that may be coupled to the gate 320D.

Some or all of the gates 320A, 320B, 320C, 320D have a respective local storage location for storing a charge related to light captured by the detector 315 at a specific time interval. For example, the gates 320A, 320B, 320C may all have different respective local storage locations. Each gate 320A, 320B, 320C, 320D functions as a switch that is biased to either pass or not pass the charge collected at the detector 315 to, e.g., a local storage area associated with the gate or a drain (e.g., ground). In some embodiments, at least one of the gates 320A, 320B, 320C, 320D operates as a drain gate and does not have a local storage location, and instead drops a charge (e.g., via a ground) received from the detector 315 while active. For example, the gate 320D may be implemented as a drain.

The respective local storage location of each gate 320A, 320B, 320C may be implemented as an analog electron storage area (e.g., a capacitor) for storing an analog charge generated from the light captured by the detector 315. In some embodiments, the respective local storage location of each gate 320A, 320B, 320C may be coupled to an analog-to-digital converter for converting the analog charge into digital information (i.e., a digital value quantifying an amount of analog charge). Note that in a single augmented pixel 310 there is a plurality of local storage locations that are each associated with a respective gate, and the local storage locations are all local to the single augmented pixel 310 and do not belong to any other augmented pixels 310. Thus, the local storage locations are associated with the particular augmented pixel 310, and they do not represent e.g., a memory bank separate from the depth sensor 300.

In some embodiments, the controller 245 determines the depth information for the local area based on, e.g., indirect time-of-flight depth sensing. For the indirect time-of-flight depth sensing, the controller 245 may first determine a phase of light captured at each augmented pixel 310, based on the image data stored in the respective local storage locations of that augmented pixel 310. The controller 245 may then determine the depth information for the local area based in part on the phase of light determined for each augmented pixel 310. To determine the depth information, the controller 245 calculates, for each pixel 310, coefficients a and b defined as:

$$a = \sum_{i=1}^{G} I_i \cdot \cos(i-1) \cdot 360°/G, \quad (1)$$

$$b = \sum_{i=1}^{G} I_i \cdot \sin(i-1) \cdot 360°/G, \quad (2)$$

where $I_i$, i=1, 2, ..., G, are intensities of light stored in local storage locations of that augmented pixel 310 associated with corresponding gates, and G is a total number of non-drain gates in the augmented pixel 310 (e.g., G=3). The controller 245 determines a phase φ of light captured at each augmented pixel 310 as:

$$\phi = \arctan(b/a). \quad (3)$$

The controller 245 then determines a depth d for each augmented pixel 310 as:

$$d = \phi/4\pi f c. \quad (4)$$

where c is the speed of light, and f is a frequency of captured light. Note also that a wavelength of light λ is defined as a ratio of the speed of light and the frequency of light. Thus, the depth d for each augmented pixel 310 can be determined as:

$$d = \phi/4\pi \cdot \lambda. \quad (5)$$

The controller 245 may also determine the intensity reconstruction I for each augmented pixel 310 as:

$$I = \sqrt{a^2 + b^2}. \quad (6)$$

For accurate depth determination, capture intervals over which a particular gate is active (and other gates are inactive) for all augmented pixels ideally occur at the same time. For example, a capture interval for a first gate (e.g., 320A) of each augmented pixel would occur over a same time range, a capture interval for a second gate (e.g., 320B) for each augmented pixel would occur over a same (subsequent) time range, and so on. Accordingly, it is important to maintain consistent and synchronized timing of activation/deactivation of gates (e.g., 320A-D) relative to the pulsed light being emitted by the depth camera. However, the stored light measurements at each augmented pixel are not read out instantaneously. Instead, each augmented pixel has a respective readout delay. A readout delay is a time it takes to read out charge from local storage locations of an augmented pixel (e.g., the storage locations associated with the gates 320 in the augmented pixel 310). Different augmented pixels in the depth sensor 300 can have different readout delays. Different readout delays can result in different augmented pixels having gates that are not synchronized (e.g., a gate 320A of a first augmented pixel is active over a different time period than a gate 320A of a second augmented pixel), and therefore can introduce errors in depth determination. Therefore, augmented pixels having arbitrary readout delays can introduce error into the depth map, and in particular, an error that varies between different augmented pixels, creating a distorted depth map.

Figure 3C:
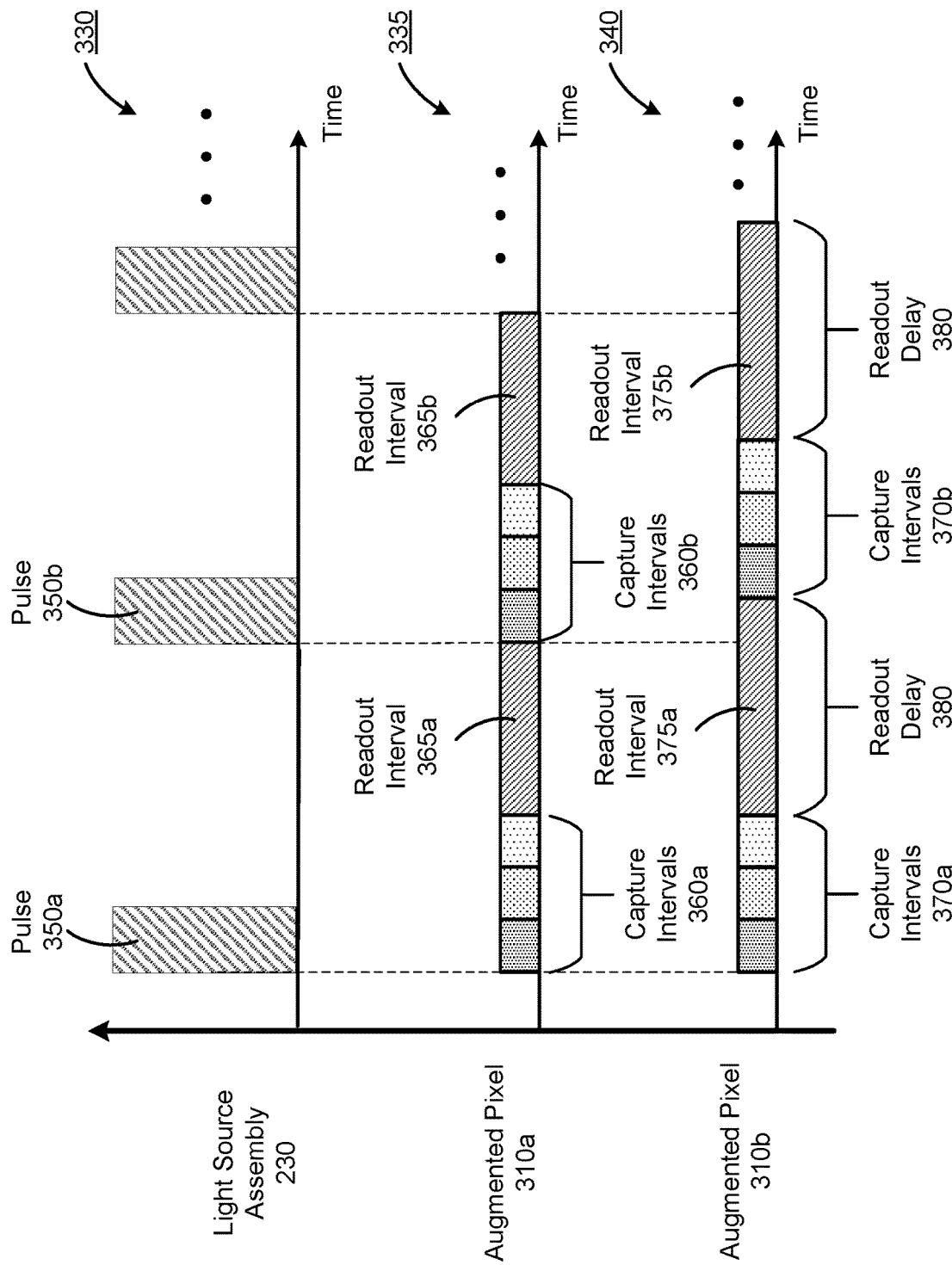
FIG. 3C are example timing diagrams showing effects of readout delays, in accordance with one or more embodiments

FIG. 3C are example timing diagrams showing effects of readout delays, in accordance with one or more embodiments. The timing diagrams 330, 335, and 340 relate to the operation of the light source assembly 230 and two augmented pixels 310a and 310b.

The timing diagram 330 shows the operation of the light source assembly 230, e.g., based on emission instructions from the controller 245. The controller 245 may instruct the light source assembly 230 to project pulses of light 350 into a local area, e.g., pulses of light 350a, 350b, etc., as shown in FIG. 3C. For example, the pulses of light 350 may have a specific pulse rate.

The timing diagram 335 is a pixel timing diagram for a first augmented pixel 310a (e.g., an embodiment of the augmented pixel 310 that has three gates) of the imaging device 240. The augmented pixel 310a may operate in accordance with the timing diagram 335 based on e.g., capture instructions from the controller 245. The augmented pixel 310 may be configured to image, over sets of capture intervals 360a, 360b, etc., a portion of the local area illuminated with the pulses of light, e.g., the pulses of light 350a, 350b, etc. As shown in FIG. 3C, each set of capture intervals 360 includes three capture intervals. Each of the three capture intervals corresponds to one of the three gates, e.g., 320A, 320B, and 320C. During a particular capture interval, one of the gates (e.g., the gate 320A) may be activated to enable an associated image storage location to store image data (i.e., intensities of light) associated with a portion of the pulse 350. The other gates (e.g., all but 320A) are inactive during this capture interval. As shown in FIG. 3C, each set of capture intervals 360 is synchronized to one of the light pulses 350.

During operation, light from one light pulse, e.g., light pulse 350a, may be captured during the first set of capture intervals 360a, the second set of capture intervals 360b, or a subsequent set of capture intervals. For example, if the pulse 350a is reflected by an object in a first range of distances, the reflected light is captured during the first set of capture intervals 360a. If the pulse 350a is reflected by a second object in a second range of distances greater than the first range of distances, the light reflected by the second object is captured during the second set of capture intervals 360b.

As shown in FIG. 3C, a readout interval 365 follows each set of capture intervals 360. During a read out interval 365, the controller 245 initiates read-out of the image data stored in the local storage locations of the augmented pixel 310a. The duration of each readout interval 365 is the length of the readout delay, i.e., the delay in reading out the charge from the local storage locations. The readout delay is a property of the augmented pixel 310a, and can vary between augmented pixels. In this embodiment, a readout interval 365 follows each set of capture intervals 360, e.g., a first readout interval 365a follows the first set of capture intervals 360a, and a second readout interval 365b follows the second set of capture intervals 360b. In other embodiments, the controller 245 initiates a readout interval 365 following multiple consecutive sets of capture intervals 360. In each readout interval 365, the controller 245 obtains the stored image data and determines depth information for the local area, based in part on the image data.

The timing diagram 340 is a pixel timing diagram for a second augmented pixel 310b (e.g., a second embodiment of the augmented pixel 310 that has three gates) of the imaging device 240. Like the timing diagram 335 for the first augmented pixel 310a, the timing diagram 340 has a set of capture intervals 370, each followed by a readout interval 375. The operation of the second augmented pixel 310b is similar to the operation of the first augmented pixel 310a, described above.

The duration of the readout intervals 375 of the second augmented pixel 310b is shown as the readout delay 380. As shown in FIG. 3C, the durations of the capture intervals 360 and readout intervals 365 are aligned to the period of the pulses 350, so that each capture interval (e.g., capture interval 360b) begins at the same time as one of the pulses (e.g., pulse 350b). The second augmented pixel 310b has a longer readout delay 380 than the readout delay of the first augmented pixel 310a. As shown in FIG. 3C, the first readout interval 375a of the second augmented pixel 310b extends past the end of first readout interval 365a of the first augmented pixel 310a. Furthermore, the first readout interval 375a of the second augmented pixel 310b extends past the start of the second pulse 350b from the light source assembly 320b. This readout delay 380 causes the second set of capture intervals 370b to be unaligned from the pulse 350b and from the set of capture intervals 360b of the first augmented pixel 310a. This lack of alignment becomes progressively more pronounced at later capture intervals 370 and readout intervals 380. The lack of alignment between the different augmented pixels 310, and the lack of alignment between some augmented pixels 310 and the light source assembly 230, impedes the ability of the controller 245 to generate accurate depth information.

Calibration Assembly for Depth Sensor

Figure 4:
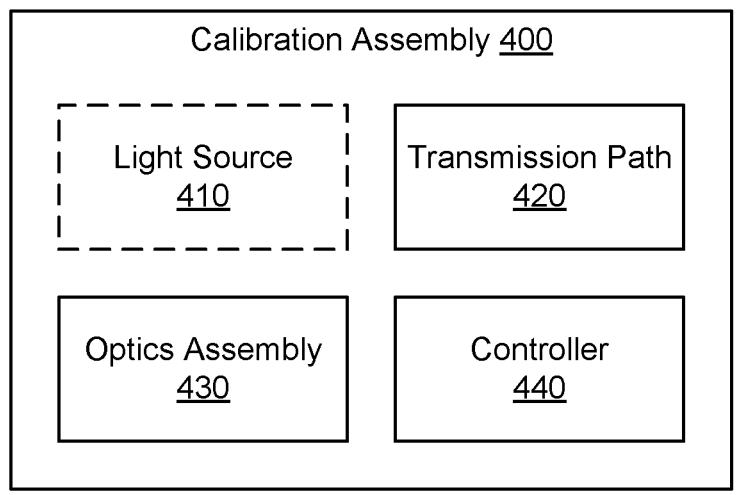
FIG. 4 is a block diagram of a calibration assembly for a depth sensor, in accordance with one or more embodiments.

FIG. 4 is a block diagram of a calibration assembly 400 for a depth sensor, in accordance with one or more embodiments. The calibration assembly 400 enables a compact, efficient calibration process that determines a readout delay for each augmented pixel. The calibration assembly 400 includes an optional light source 410, a transmission path 420, an optics assembly 430, and a controller 440.

The light source 410 generates a pulse of light for calibrating the depth sensor 300. In some embodiments, the light source 410 is included in the calibration assembly 400. The light source 410 may be configured to project light pulses such that it simulates the light source assembly 230 (e.g., pulsed light and/or a continuous train of light pulses). The light source 410 may include a plurality of light sources, e.g., a two-dimensional array of light sources. Examples of light sources include but are not limited to: lasers, light-emitting diodes (LEDs), micro light-emitting diodes (µLEDs), micro super luminescent diodes (µSLDs), vertical-cavity surface-emitting lasers (VCSELs), micro resonant cavity light-emitting diodes (µRCLEDs), etc. In other embodiments, the calibration assembly 400 does not include a light source 410, and instead uses the light source assembly 230 to generate a pulse of light for calibrating the depth sensor 300.

Figure 5:
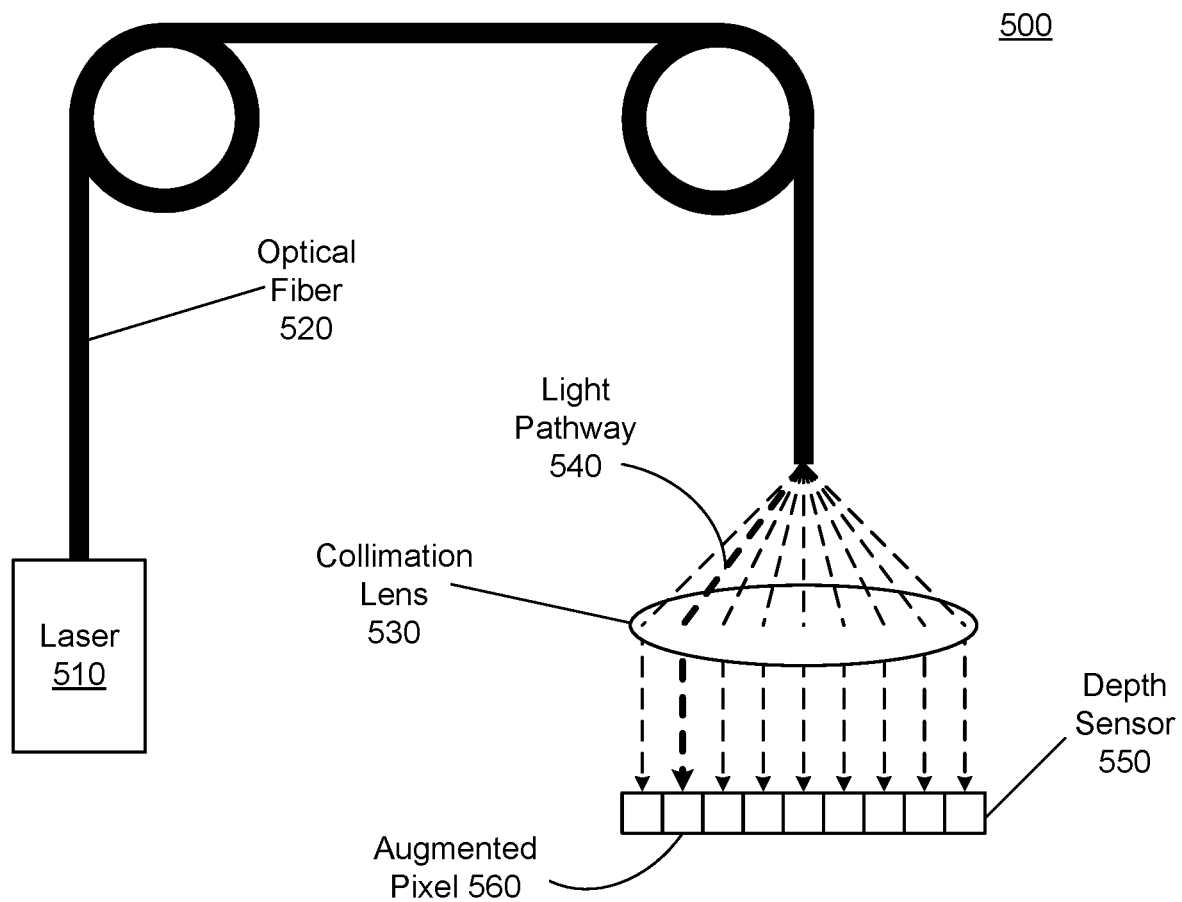
FIG. 5 is an example calibration assembly having a fiber transmission path, in accordance with one or more embodiments.
Figure 6:
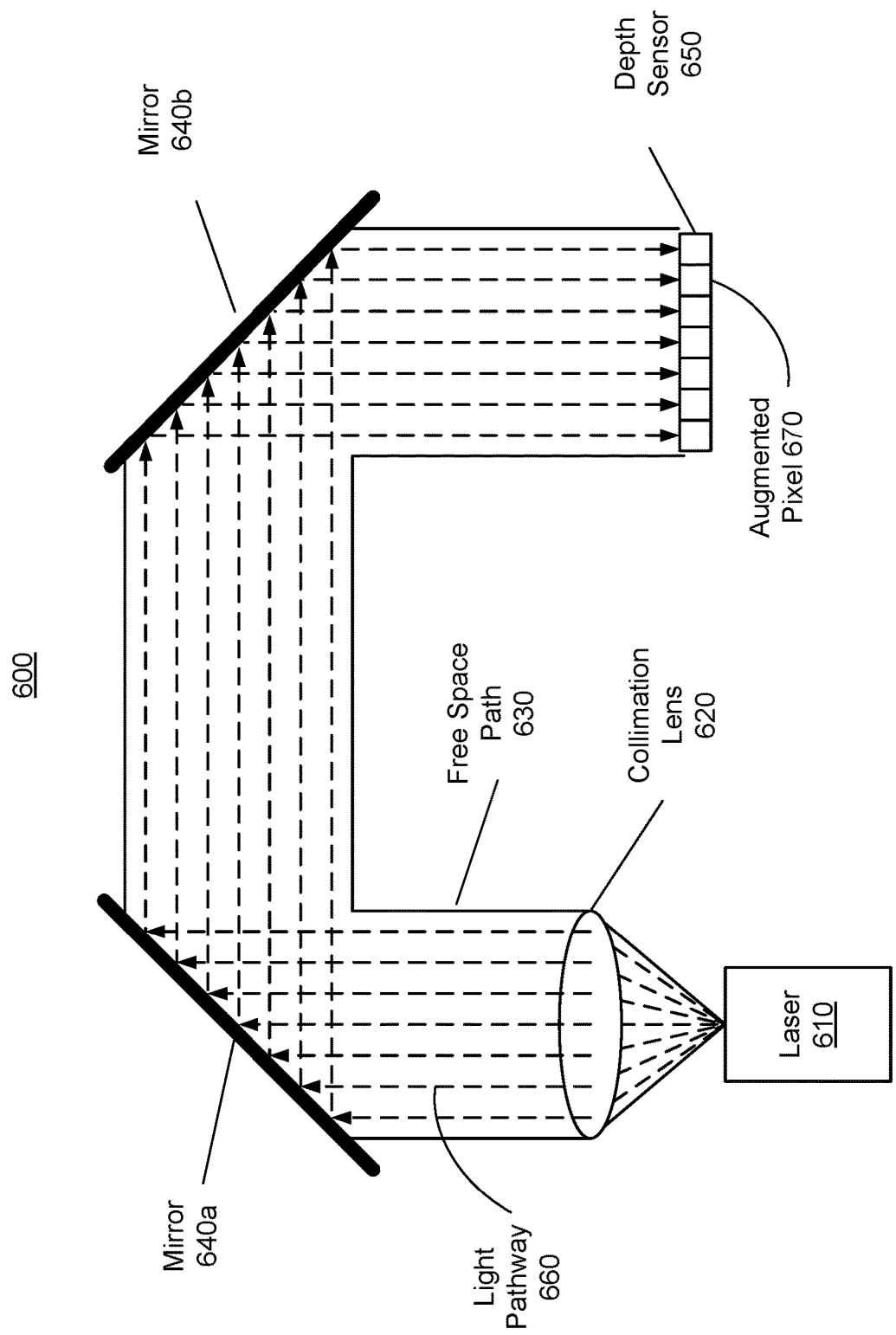
FIG. 6 is an example calibration assembly having a free-space transmission path, in accordance with one or more embodiments.

The light pulse emitted by the light source 410 or light source 230 travels through the transmission path 420. The transmission path 420 can be angled or bent so that the transmission path 420, and the full calibration assembly 400, fits within a compact space. For example, the transmission path 420 may include an optical fiber comprised of multiple loops, as shown in FIG. 5, or a free space path formed using a set of mirrors, as shown in FIG. 6. The transmission path 420 can be configured so that the calibration assembly 400 fits within a test bench, for example. The transmission path 420 has a known length and known refractive index that can be used to calculate the time of flight of the pulse of light from the light source 410 to the depth sensor 300. For example, the refractive index for air is 1.00029 (or approximately 1); the refractive index for an optical fiber can vary based on the optical fiber, but a typical optical fiber has a refractive index around 1.44 to 1.45. In some embodiments, the transmission path 420 has multiple sections, e.g., an optical fiber section and a free space section.

The optics assembly 430 couples light into and/or out of the transmission path 420 for delivery to the depth sensor 300. For example, the optics assembly 320 may be one or more lenses that incouple light into the transmission path 420. The one or more lenses may, e.g., collimate and/or adjust a size of the collimated beam such that when out-coupled it would span the depth sensor 300 (i.e., provides light to each augmented pixel). In some embodiments, the optics assembly 430 outcouples light from the transmission path 420 such that the outcoupled light spans the depth sensor 300. In some embodiments, the outcoupled light may be collimated. The optics assembly 430 includes a collimating lens and any other optics equipment for coupling light into or out of the transmission path 420. The optics assembly 430 may be positioned along the transmission path 420 or at either end of the transmission path 420, e.g., between the output of the light source 410 (or light source assembly 230) and input of the transmission path 420, or between the output of the transmission path 420 and the input to the depth sensor 300.

The controller 440 computes a readout delay for each augmented pixel of the depth sensor 300. The controller 440 is coupled to the depth sensor 300, and to the light source 410 or light source assembly 230. The controller 440 determines a first time at which the pulse of light is emitted from the light source 410 or light source assembly 230. The controller 440 also determines, for a given augmented pixel, a second time at which a measurement of the pulse of light detected at the augmented pixel is read out from the augmented pixel. The controller 440 also computes an estimated travel time for the pulse of light from the light source to the given augmented pixel. Based on the first time, the second time, and the estimated travel time, the controller 440 computes a readout delay for the given augmented pixel.

To determine the first time at which the pulse of light is emitted from the light source 410 or 230, the controller 440 may instruct the light source to emit a light pulse, and store the time at which the light pulse is emitted. As another example, the controller 440 receives a time from the light source at which the light source emitted the light pulse. In this example, the controller 440 and light source may perform a clock synchronization process (e.g., the two controllers synchronize to each other, or each controller synchronizes to a master clock) so that the first time provided by the light source 410 is in a proper frame of reference at the controller 440.

In some embodiments, the controller 330 instructs the light source to emit multiple light pulses, e.g., one light pulse for each storage area of the given augmented pixel. In other embodiments, all of the gates for the given augmented pixel open simultaneously, and charge is stored in each storage area simultaneously. In such embodiments, a single pulse of light may be sufficient, e.g., if the light source 410 provides sufficient power to capture the light pulse in each storage area. In other embodiments in which all gates of the given augmented pixel open simultaneously, the light source 410 emits multiple light pulses, each of which is captured by each of the storage areas, to provide a better signal-to-noise ratio.

The second time at which the measurement of the pulse of light detected at the given augmented pixel is read out from the augmented pixel can be determined in different ways, based on the calibration setup. In one embodiment, the depth sensor 300 is being calibrated independently of other elements of the DCA 115, and the controller 440 connects directly to the given augmented pixel, in the same arrangement as the controller 245 connects to the augmented pixel 310 shown in FIG. 3B. The controller 440 receives the measurement of the pulse of light detected at the given augmented pixel directly from the augmented pixel, and the controller 440 stores the time it received the readout from the given augmented pixel.

In another embodiment, the depth sensor 300 is connected to the controller 245 prior to calibration. In this embodiment, the controller 440 instructs the controller 245 to capture a time at which the measurement of the pulse of light detected at the given augmented pixel was read out to the controller 245 from the given augmented pixel, and to provide this readout time to the controller 440. The controller 440 and the controller 245 may perform a clock synchronization process so that the controller 440 receives the second time in proper relation to the first time at which the light pulse was sent. If the full DCA 115, including the light source assembly 230, is assembled prior to calibration, the controller 245 may capture both the first time at which the light source assembly 230 emitted the light pulse, and the second time at which the given augmented pixel read out the measurement of the pulse of light to the controller 245. In such embodiments, the calibration assembly 400 may not include a dedicated controller, and the controller 245 may perform the functions of the controller 440. Alternatively, the controller 245 may provide the captured first time and the second time, or a difference between the first time and the second time, to the controller 440, which performs the remainder of the calibration process.

To compute the measured travel time for the pulse of light based on the first time and the second time, the controller 440 calculates the difference between the first time and the second time. To compute the estimated travel time for the pulse of light from the light source to the given augmented pixel, the controller 440 uses the following formula:

$$\text{Estimated Travel Time} = n_{tp} \times L_{tp} + \Delta L_{pixel}/c$$

where $n_{tp}$ is the index of refraction of the transmission path 420 (e.g., the index of refraction of an optical fiber for a fiber path, or the index of refraction of air for a free space path), $L_{tp}$ is the length of the transmission path 420, $\Delta L_{pixel}$ is a path length through the optics assembly 430 for the augmented pixel, and c is the speed of light. In some embodiments, the total path length traversed by the pulse of light, including both the transmission path 420 and the optics assembly 430, is similar enough for different augmented pixels that a single $\Delta L$ may be used for each augmented pixel in the depth assembly 300. In some embodiments, $\Delta L$ may be omitted from the calculation of estimated travel time if $\Delta L$ is sufficiently small or if sufficient accuracy can be achieved with $\Delta L$ omitted. For example, if 1 mm of resolution is desired, $\Delta L$ may be ignored if its value is on the order of 1 μm. After computing the estimated travel time and the measured travel time, the controller 440 computes the readout delay by computing the difference between the measured travel time and the estimated travel time.

The controller 440 calculates the readout delay for each augmented pixel using the above process. In particular, for each augmented pixel, the controller 440 determines times at which measurements of the pulse of light detected at each augmented pixel are read out, computes readout delays for each augmented pixel, and stores the computed readout delays. If, as noted above, the total optical path length for each augmented pixel is sufficiently similar, the controller 440 may use the same estimated travel time to compute the readout delay for each augmented pixel. In some embodiments, a single pulse of light emitted at a first time is captured by all of the augmented pixels in the depth sensor 300, and the second times for reading out each augmented pixel are captured in parallel. In such embodiments, a single light pulse may be sufficient to calibrate a full depth sensor 300. In other embodiments, multiple light pulses are used to calibrate the depth sensor 300; e.g., one light pulse per augmented pixel, or one light pulse for a batch of augmented pixels. In some embodiments, a single light pulse is sufficient to calibrate an augmented pixel, which results in a fast calibration process for each depth sensor 300 and a high throughput.

The computed readout delays for the augmented pixels are stored on the DCA 115 that includes the depth sensor with the augmented pixels. The DCA 115 is configured to calibrate out the stored readout delay for an augmented pixel relative to other augmented pixels of the depth sensor 300. For example, the controller 245 instructs augmented pixels to read out light measurements at a readout time based on the readout delay, e.g., by delaying the readout for augmented pixels that were determined to have relatively short readout delays. As another example, the controller 245 adjusts light measurements read out from each augmented pixel based on the readout delay, e.g., by adjusting a measured depth for an augmented pixel based on the readout delay. As an example, the stored readout delay for a given augmented pixel has a readout delay $\Delta t$, and the measured depth for the given augmented pixel is $d_{measured}$. The controller 245 estimates a corrected depth $d_{correct} = d_{measured} - \Delta t * c$, where c is the speed of light.

FIG. 5 is an example calibration assembly 500 having a fiber transmission path, in accordance with one or more embodiments. The calibration assembly 500 includes a laser 510, which is an embodiment of the light source 410. The laser 510 generates one or more pulses of coherent light that are coupled into an optical fiber 520. The optical fiber 520 is an embodiment of the transmission path 420. As depicted in FIG. 5, the optical fiber 520 is looped to reduce the amount of physical space needed for the calibration assembly 500. The output of the optical fiber 520 is directed at a collimation lens 530, which is an embodiment of the optics assembly 430. Various light pathways, such as light pathway 540, of the pulse of light traveling from the optical fiber 520 and through the collimation lens 530 are shown. The collimation lens is arranged to direct light emitted from the optical fiber 520 to a depth sensor 550, which has a set of augmented pixels, such as augmented pixel 560. The depth sensor 550 is an embodiment of the depth sensor 300 shown in FIG. 3. The light pathways are shown exiting collimation lens 530 as a collimated beam directed towards the augmented pixels of the depth sensor 550. For example, light pathway 540 is directed towards augmented pixel 560. While the portion of the light pathway 540 inside the optical fiber 520 is not shown, the full light pathway 540 extends from the output of the laser 510 to the input the augmented pixel 560.

In this embodiment, $L_{tp}$ is the length of the optical fiber 520. $\Delta L_{pixel}$ for a given augmented pixel is a length of the portion of the light pathway between the output of the optical fiber 520 and the augmented pixel that receives light along the light pathway. $\Delta L_{pixel}$ for the light pathway 540 is the length of the thick dotted line (i.e., the length of the line extending from the exit of the optical fiber 520 to the collimation lens 530, through the collimation lens 530, and to the augmented pixel 560). As shown in FIG. 5, different augmented pixels have different lengths for $\Delta L_{pixel}$. For example, augmented pixels towards the edges of the depth sensor 550 have a greater $\Delta L_{pixel}$ than augmented pixels towards the center of the depth sensor 550. The geometry of FIG. 5 is exaggerated, and the width of a depth sensor 550 may be small, e.g., on the order of a millimeter. Thus, the difference in $\Delta L_{pixel}$ between edge augmented pixels and center augmented pixels may be small, e.g., on the order of a millimeter, and thus may be inconsequential in the depth map generated by the depth sensor 550. Accordingly, as noted above, the same $\Delta L_{pixel}$ may be used for all augmented pixels.

FIG. 6 is an example calibration assembly 600 having a free-space transmission path, in accordance with one or more embodiments. The calibration assembly 600 includes a laser 610, which is an embodiment of the light source 410. The laser 610 generates one or more pulses of coherent light that are directed towards a collimation lens 620. The collimation lens 620 is an embodiment of the optics assembly 430. The light emitted from the laser 610 exits the collimation lens 620 as a collimated beam. The collimated beam emitted by the collimation lens 630 is directed to a set of mirrors 640 that form a free space path 630. The free space path 630 formed by the mirrors 640 is an embodiment of the transmission path 420. While two mirrors 640a and 640b are shown in FIG. 6, fewer mirrors or more mirrors may be included in the calibration assembly 600. For example, a calibration assembly having more mirrors can be formed in a small amount of physical space, e.g., on a single test bench.

The last mirror forming the free space path 630 (in FIG. 6, mirror 640b) directs the pulse of light to a depth sensor 650, which has a set of augmented pixels. Various light pathways are shown exiting the laser 610, traveling through the collimation lens 620, reflecting off the mirrors 640b, and entering the augmented pixels of the depth sensor 650. Each light pathway extends from the laser 610 to an augmented pixel 670. For example, light pathway 660 labelled in FIG. 6 reflects off the mirrors 640a and 640b to reach the augmented pixel 670.

Process for Calibrating the Depth Sensor

Figure 7:
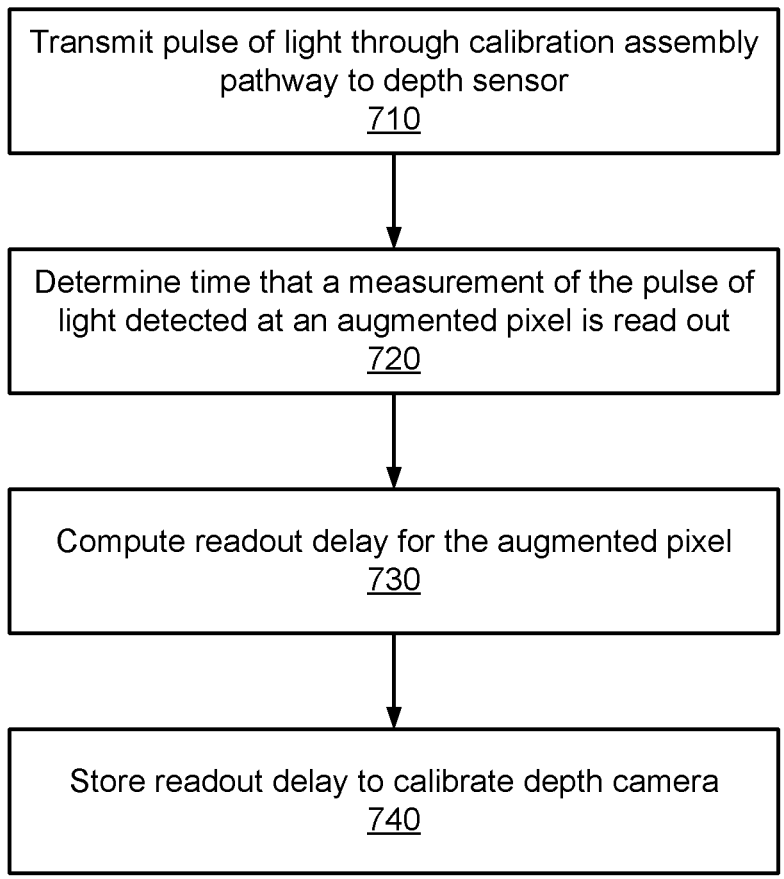
FIG. 7 is flowchart illustrating a process for calibrating a depth sensor, in accordance with one or more embodiments.

FIG. 7 is flowchart illustrating a process 700 for calibrating a depth sensor, in accordance with one or more embodiments. The process 700 of FIG. 7 may be performed by the components of a calibration assembly, e.g., the calibration assemblies described with respect to FIGS. 4-6. Other entities (e.g., a DCA 115) may perform some or all of the steps of the process in other embodiments. Likewise, embodiments may include different and/or additional steps, or perform the steps in different orders.

The calibration assembly 400 transmits 710 a pulse of light through a pathway of the calibration assembly to a depth sensor. For example, in the embodiment shown in FIG. 5, the calibration assembly 500 transmits a pulse of light emitted by the laser 510 through a pathway including the optical fiber 520 and collimation lens 530 to the depth sensor 550. In the embodiment shown in FIG. 6, the calibration assembly 600 transmits a pulse of light emitted by the laser 610 through a pathway including the collimation lens 620 and the free space path 630 formed by the mirrors 640 to the depth sensor 650. In alternate embodiments, the calibration assembly causes a light source in the DCA 115, such as the light source assembly 230, to emit a pulse of light that is transmitted through a pathway, such as a pathway including an optical fiber or a free space path, to the depth sensor included in the camera assembly 240.

The calibration assembly 400 determines 720 a time that a measurement of the pulse of light detected at an augmented pixel is read out. In an embodiment, an augmented pixel 310 of the depth sensor 300 detects the pulse of light, obtains a measurement of the pulse of light, and reads out this measurement to a controller, such as the controller 245, or a controller 440 of the calibration assembly 400. For example, the augmented pixel 310 may store charge in multiple storage areas (e.g., the storage areas for gates 320A, 320B, and 320C) simultaneously, and read out the stored charge. In other embodiments, the augmented pixel 310 may store charge in storage areas sequentially, as described with respect to FIG. 3C, and then read out the stored charge. The calibration assembly (e.g., the controller 440) determines the time at which the measurement is read out from the augmented pixel 310.

The calibration assembly 400 computes 730 a readout delay for the augmented pixel. In an embodiment, the controller 440 determines a time at which the light pulse was emitted, and computes the measured travel time between the emission time and the readout time. The controller 440 also calculates an estimated travel time for the pulse of light from the light source to the augmented pixel 310, e.g., based on the path length of the pathway and the index of refraction of the pathway. The controller 440 calculates the readout delay based on the measured travel time and the estimated travel time.

The calibration assembly 400 stores 740 the readout delay to calibrate the depth camera. For example, the calibration assembly 400 stores the calculated readout delay on the controller 245 of the DCA 115. The controller 245 may use the readout delay to calibrate out the readout delay relative to other augmented pixels of the depth sensor 300. This enables the DCA 115 to generate a more accurate depth map.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   transmitting a pulse of light from a light source through a pathway of a calibration assembly to a depth sensor at a first time, wherein the pathway has a path length;
   determining a second time at which a measurement of the pulse of light detected at an augmented pixel is read out from the augmented pixel, wherein the augmented pixel is part of the depth sensor and the augmented pixel includes a plurality of local storage locations that store measurements of detected light;
   computing an estimated travel time to the augmented pixel, the estimated travel time based in part on the path length and an index of refraction of the pathway;
   computing a measured travel time associated with the augmented pixel, the measured travel time based on a difference between the second time and the first time;
   computing a readout delay for the augmented pixel, the readout delay being a difference between the measured travel time and the estimated travel time, wherein the readout delay for the augmented pixel describes a time delay in reading out the measurements from the local storage locations; and
   storing the readout delay, wherein a depth camera that includes the depth sensor is configured to calibrate out the readout delay relative to other augmented pixels of the depth sensor.

2. The method of claim 1, wherein the measured travel time is equal to the difference between the first time and the second time.

3. The method of claim 1, wherein storing the readout delay comprises storing the readout delay on the depth camera, and the depth camera is configured to calibrate out the readout delay by instructing the augmented pixel to read out light measurements at a readout time based on the readout delay.

4. The method of claim 1, wherein storing the readout delay comprises storing the readout delay on the depth camera, and the depth camera is configured to adjust light measurements from the augmented pixel based on the readout delay.

5. The method of claim 1, further comprising:
   determining times at which measurements of the pulse of light detected at each augmented pixel of the depth sensor are read out;
   computing readout delays for each augmented pixel of the depth sensor; and
   storing the readout delays for each augmented pixel of the depth sensor.

6. The method of claim 1, wherein the pathway comprises a fiber coupled to a collimation lens.

7. The method of claim 1, wherein the pathway comprises a collimation lens and at least one mirror for directing the pulse of light to the depth sensor.

8. The method of claim 1, wherein the light source is a light source assembly included in the depth camera.

9. A calibration assembly comprising:
   a pathway coupled to a light source through which a pulse of light from the light source is directed to a depth sensor at a first time, wherein the pathway has a path length; and
   a controller coupled to the depth sensor, the controller including one or more processors configured to:
      determine a second time at which a measurement of the pulse of light detected at an augmented pixel is read out from the augmented pixel, wherein the augmented pixel is part of the depth sensor and the augmented pixel includes a plurality of local storage locations that store measurements of detected light;
      compute an estimated travel time to the augmented pixel, the estimated travel time based in part on the path length and an index of refraction of the pathway;
      compute a measured travel time associated with the augmented pixel, the measured travel time based on a difference between the second time and the first time;
      compute a readout delay for the augmented pixel, the readout delay being a difference between the measured travel time and the estimated travel time, wherein the readout delay for the augmented pixel describes a time delay in reading out the measurements from the local storage locations; and
      store the readout delay, wherein a depth camera that includes the depth sensor is configured to calibrate out the readout delay relative to other augmented pixels of the depth sensor.

10. The calibration assembly of claim 9, wherein
the measured travel time is equal to the difference between the first time and the second time.

11. The calibration assembly of claim 9, wherein the controller is configured to store the readout delay on the depth camera, and the depth camera is configured to calibrate out the readout delay by instructing the augmented pixel to read out light measurements at a readout time based on the readout delay.

12. The calibration assembly of claim 9, wherein the controller is configured to store the readout delay on the depth camera, and the depth camera is configured to adjust light measurements from the augmented pixel based on the readout delay.

13. The calibration assembly of claim 9, wherein the controller is further configured to:
  determine times at which measurements of the pulse of light detected at each augmented pixel of the depth sensor are read out;
  compute readout delays for each augmented pixel of the depth sensor; and
  store the readout delays for each augmented pixel of the depth sensor.

14. The calibration assembly of claim 9, wherein the pathway comprises a fiber coupled to a collimation lens.

15. The calibration assembly of claim 9, wherein the pathway comprises a collimation lens and at least one mirror for directing the pulse of light to the depth sensor.

16. The calibration assembly of claim 9, wherein the light source is a light source assembly included in the depth camera.

* * * * *